United States Patent [19]
Marchello

[11] 3,980,320
[45] Sept. 14, 1976

[54] BICYCLE SUPPORT STAND

[76] Inventor: John L. Marchello, Box 100, New Hudson, Mich. 48178

[22] Filed: Aug. 27, 1975

[21] Appl. No.: 608,035

[52] U.S. Cl. ................................ 280/293; 211/22
[51] Int. Cl.² ........................................ B62H 3/10
[58] Field of Search ............... 280/293; 248/226 R, 248/351, 359; 211/17, 22

[56] References Cited
UNITED STATES PATENTS

| | | |
|---|---|---|
| 564,733 | 7/1896 | Beardsley ........................... 211/22 |
| 594,373 | 11/1897 | Beardsley et al. .................. 211/22 |
| 605,429 | 6/1898 | Howard ............................... 211/22 |
| 611,672 | 10/1898 | Beecher .............................. 211/22 |
| 3,712,637 | 1/1973 | Townsend ........................... 280/293 |

FOREIGN PATENTS OR APPLICATIONS

| | | |
|---|---|---|
| 1,247,112 | 10/1960 | France ................................ 211/22 |
| 1,064,321 | 5/1954 | France ................................ 280/293 |
| 358,259 | 4/1938 | Italy .................................... 280/293 |
| 5,577 | 11/1894 | Sweden ............................... 280/293 |
| 12,947 | 1892 | United Kingdom ................. 211/22 |
| 496,924 | 12/1938 | United Kingdom ................. 280/293 |
| 1,864 | 1898 | United Kingdom ................. 211/22 |
| 604,659 | 7/1948 | United Kingdom ................. 211/22 |

*Primary Examiner*—M. H. Wood, Jr.
*Assistant Examiner*—Jack D. Rubenstein
*Attorney, Agent, or Firm*—Cullen, Settle, Sloman & Cantor

[57] ABSTRACT

A bicycle support stand for detachable engagement with the bicycle pedal crank hub and adjacent bicycle frame element, for extending beneath the bicycle frame a sufficient distance to selectively support the bicycle upright on either its front or rear wheels. The stand is formed of a pair of metal rods joined together to form an upper frame element receiving fork and a pair of downwardly diverging legs extending transversely of and on opposite sides of the plane of the bicycle frame, with an upwardly opening support bracket joined to the rods between their ends, to receive and support the bicycle pedal crank hub. A manually applied hook engages over the bicycle frame element to releasably fasten the stand to the bicycle frame.

8 Claims, 9 Drawing Figures

U.S. Patent  Sept. 14, 1976  3,980,320
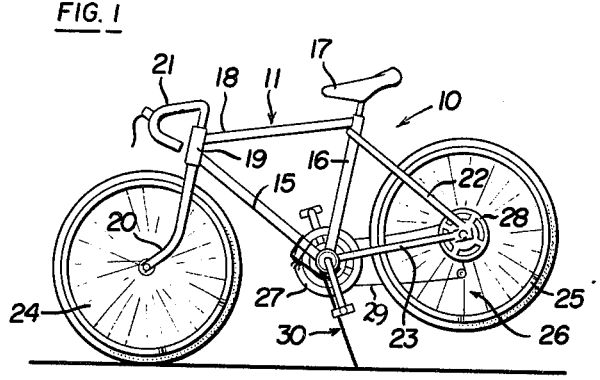
FIG. 1
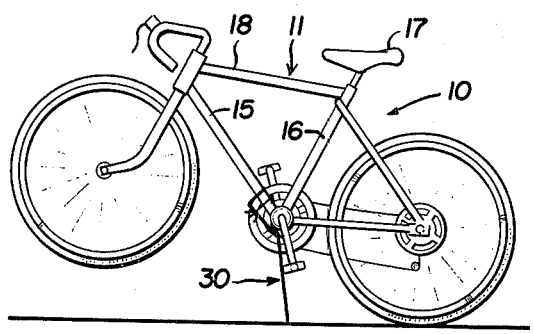
FIG. 2
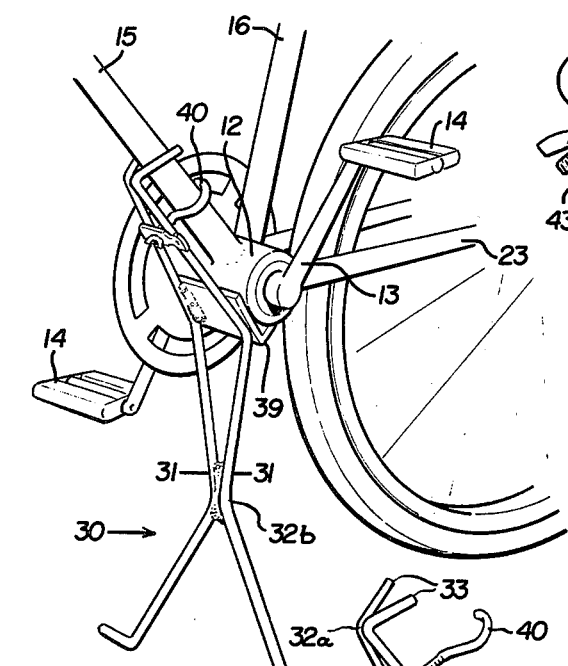
FIG. 3
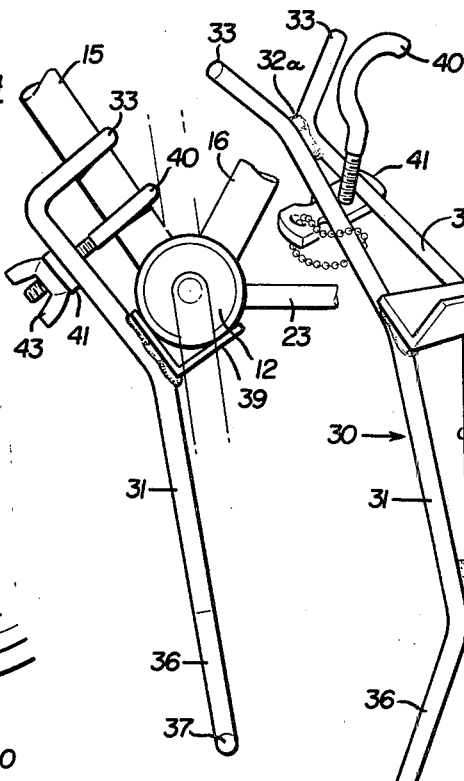
FIG. 4
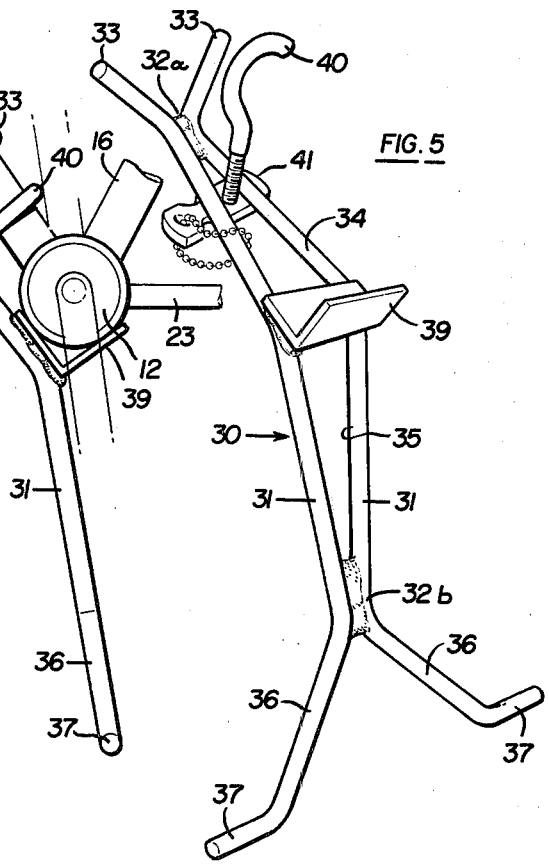
FIG. 5
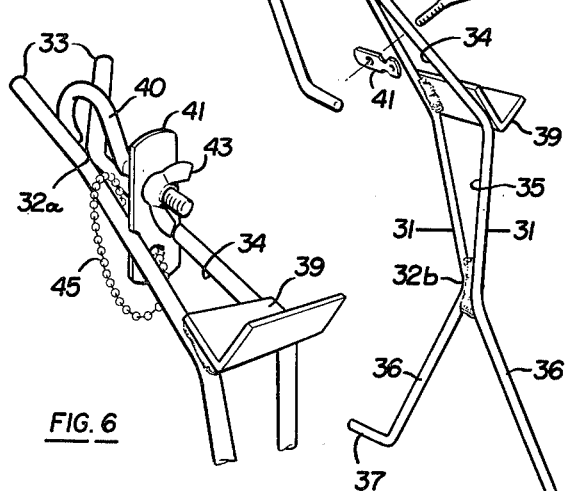
FIG. 6
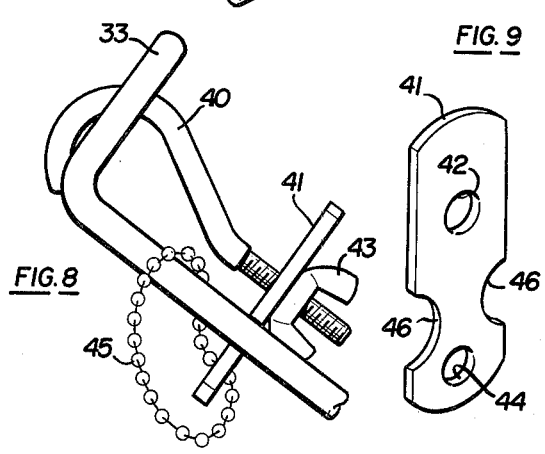
FIG. 7
FIG. 8
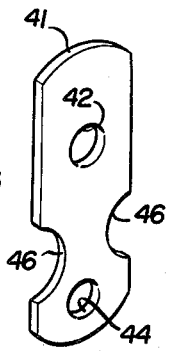
FIG. 9

BICYCLE SUPPORT STAND

BACKGROUND OF INVENTION

The invention herein relates to a stand for mounting upon a bicycle frame when the bicycle forward or rear wheels, or both, are to be serviced. Bicycles are normally equipped with a support stand comprising a rod-like lever connected at one end to the bicycle frame for swinging downwardly along one side of the bicycle and thereby supporting the bicycle in an upright, but inclined, position. Such frames cannot be used to actually lift either the front or rear wheels off the ground. Thus, servicing the wheels or the chain drive system requires some way of lifting and holding the bicycle off the ground. This is usually accomplished by turning the bicycle upside down during servicing. However, this is awkward and does not always permit proper adjustments.

Hence, the invention herein deals with the problem of providing a stand which maintains the bicycle in an upright position with one of its wheels, i.e., either the forward or rear wheel, raised. The support stand is made so that normally it is separate from the bicycle and can be applied thereto rapidly with minimum manual manipulations.

SUMMARY OF THE INVENTION

The invention herein contemplates a bicycle support stand having an upper forked end to receive the forward frame element connected to the pedal crank hub and also to receive such hub itself and to extend downwardly from the hub into a pair of diverging legs arranged at opposite sides of the longitudinal plane of the bicycle so that the bicycle can be balanced upon such legs and either the front or rear wheels of the bicycle, depending upon which way the bicycle is tilted. The stand may be secured to the bicycle by a simple hook connection which rigidly and temporarily fastens the bicycle frame to the stand. Thus, the stand may be connected or removed from the bicycle rapidly by simply engaging or disengaging the hook.

The invention herein further contemplates forming the hook type of connection for securing the stand to the frame in such a manner as to keep the hook with the stand for both storage and use positions to thereby avoid loss thereof.

The stand herein is so made that it may be formed of a pair of metal rods which may be welded together in two places and then bent to form the upper frame element receiving fork, the two lower diverging legs, and a widened central portion for rigidity and strength, which central portion is further rigidified by a bracket which also functions to loosely support the bicycle pedal crank hub. Thus, the stand construction is simple and inexpensive and yet provides sufficient rigidity to properly support a conventional bicycle during servicing activities thereon.

These and other objects and advantages of this invention will become apparent upon reading the following description of which the attached drawings form a part.

DESCRIPTION OF DRAWINGS

FIG. 1 is a schematic configuration of a conventional bicycle with the stand herein secured thereto and with the bicycle tilted so that its rear wheel is elevated and it is supported upon the stand and the forward wheel.

FIG. 2 is a schematic view similar to FIG. 1, but showing the bicycle tilted in the opposite direction, that is, rested upon its rear wheel and the stand herein.

FIG. 3 is a perspective, fragmentary view showing the bicycle stand herein mounted upon a bicycle frame.

FIG. 4 is an elevational, side view, showing the stand secured to the adjacent bicycle frame elements.

FIG. 5 is a perspective view of the stand itself.

FIG. 6 is a perspective view of the stand showing the hook engaging means fastened in its storage position.

FIG. 7 is a perspective view of the stand showing the hook fastening device disengaged therefrom.

FIG. 8 is an enlarged, fragmentary view showing the upper end of the stand with the hook in storage position.

FIG. 9 is a perspective view of the hook locking plate.

DETAILED DESCRIPTION

FIGS. 1 and 2 schematically illustrate a conventional bicycle 10 whose construction forms no part of the invention herein. For explanation purposes, the parts of the bicycle are briefly described, as follows: The bicycle is formed of a conventional frame 11 having a pedal crank hub 12 receiving a conventional pedal crank 13 upon which the pedals 14 are mounted. The frame includes a forwardly inclined frame member 15 welded to the pedal crank hub and a corresponding rearwardly inclined support frame member 16 upon which the seat 17 is mounted. The frame also includes a horizontal frame member 18 which, together with the frame member 15, is fastened to a bearing tube element 19 through which is journalled the upper portion of the front wheel fork element 20 to which the handlebars 21 are secured.

The frame also includes the rear wheel frame fork members 22 and 23. Rotatably secured to the frame in the conventional manner is a front wheel 24 and a rear wheel 25 with a chain drive mechanism 26 which may be of the so-called derailleur-type which gives a multi-gear drive and which includes a front gear drive 27 connected to the pedal crank and a multiple gear rear drive 28 connected by the bicycle chain 29 to the front gear drive.

The support stand herein may be utilized with any form of bicycle but it is particularly useful for the multiple speed derailleur mechanism type bicycles since these require fairly frequent adjustment which can best be performed by keeping the bicycle in a vertically upright position with the rear wheel elevated so as to permit the wheel to be rotated while adjusting the drive mechanism.

The invention herein concerns the stand generally designated 30 formed of a pair of rigid metal rods 31, arranged side by side and welded together near their upper and lower ends to form an upper juncture 32a and a lower juncture 32b. Above the upper juncture the end portions of the rods are bent apart to form an upwardly opening V-shape fork 33.

Between the two weld points, the legs are bent into an upper, downwardly diverging portion 34 and a lower, downwardly converging portion 35. Below the lower juncture 32b the rods are bent into lower diverging legs 36 terminating in horizontal leg extensions 37 for resting upon the ground. In addition, the upper diverging portion 34 is bent forwardly, relative to the bicycle frame.

Welded to the widened area at approximately the middle of the rods is an angle strip 39, i.e., of 90° angle bend, to form a support or receptacle for the bicycle frame pedal crank hub.

As illustrated in the drawings, the stand is normally kept separately from the bicycle. However, when the stand is needed, it is arranged beneath the bicycle frame so that the member 39 receives the pedal crank hub with the upper portion of the stand arranged generally parallel to and beneath the bicycle frame element 15 which is received within the V-shaped fork at the upper end of the stand. The stand portion extending downwardly from the support member 39 is of sufficient length i.e., greater than the height of the bicycle hub above the ground, so as to permit lifting of either the forward or rear end of the bicycle above ground as illustrated in FIGS. 1 and 2.

In order to firmly attach the stand to the bicycle frame during servicing of the bicycle, as for example, in removing the wheels or adjusting the chain drive mechanism, a quick release engagement device is provided. This comprises a hook 40 for engaging about the frame element 15 and having a threaded shaft portion which extends through the hole 42 in a hook plate 41 and is secured thereto by a wing nut 43.

The plate 41 is flexibly and loosely connected to the stand at all times by means of a simple chain 45 extending through a chain hole 44 in the plate.

As illustrated in FIGS. 3–5, when the stand is to be attached to the bicycle frame, the hook is extended through the space between the pair of rods just beneath the upper welded juncture with the threaded end of the hook extending through the plate, which bridges the two rods. Thus, by tightening the wing nut, the hook is tightened around the frame element 15 (see FIG. 3).

However, for storage, to avoid the loss of the hook, the hook may be engaged through the fork between the legs 33 at the upper end of the stand (see FIG. 6) with the plate now arranged transversely between the two rods. Side indentations 46 at the opposite sides of the plate (see FIG. 9) each receive the adjacent rod portion to hold the plate in place during tightening of the wing nut 43 to keep the hook in its storage position. In this manner, the hook may be stored and the plate with the hook may be additionally connected by means of the chain to the stand proper to thus keep the parts together for use when needed.

As can be seen, the construction herein provides a simple, rigid, easily used stand which may be rapidly applied or removed from the bicycle as desired and which thus functions as a servicing tool for the use of the bicycle owner.

In order to avoid damaging the paint finish on a bicycle, the stand is preferably coated with a rubbery or resilient finish, such as a vinyl plastisol material which is applied in a thickness slightly greater than normal paint thickness and which gives a rubbery or resilient surface finish.

Having fully described an operative embodiment of this invention, I now claim:

1. A bicycle support stand for supporting in an upright position a conventional bicycle having a frame including a pedal crank hub with an upwardly and forwardly extending tubular frame element secured thereto, comprising:

a normally upright, elongated member having an upper fork portion for receiving and supporting said frame element and a central upwardly opening support member upon which the pedal crank hub is rested, and a lower portion formed with downwardly diverging ground engaging legs extending outwardly of the longitudinal plane of the frame of the bicycle;

means for manually releasably securing said elongated member to said frame member;

with the length of said elongated member between said support member and the lower ends of said legs being greater than the normal distance between the pedal crank hub and the ground, so that the bicycle is selectively supported upright upon the legs and either the front or rear wheels, with the opposite wheel raised above ground;

and said elongated member being formed of two elongated rods which are joined together near their upper ends and also joined together at a distance from their lower ends, with said rods being bent to diverge upwardly from their upper juncture to form said fork portion, and to diverge downwardly from their lower juncture into an inverted V-shaped portion which forms the said legs; and with the support member located roughly centrally between said junctures;

and the rod portions located between said support member and said upper juncture being bent forwardly relative to the longitudinal frame of the bicycle frame and roughly parallel to and for arrangement beneath said tubular element.

2. A construction as defined in claim 1, and said rod portions between the upper juncture and the support member being bent into an inverted V-shape, with the rod portions between the lower juncture and the support member being bent into an upright V-shape and said support member spanning the gap between and being rigidly connected to the rods.

3. A construction as defined in claim 2, and said support member being formed of a rigid, roughly V-shaped strip, having one leg secured to both of their adjacent rod portions and its opposite leg extending upwardly and rearwardly relative to the bicycle frame to form an upwardly opening support for the pedal crank hub.

4. A construction as defined in claim 2, and said means for securing said elongated member to said frame element comprising a hook having a hook portion for looping around the frame element and a threaded shaft portion for extending between the rods between their upper juncture and their support member;

and a plate having an opening receiving the hook shaft portion for securing the hook to the elongated member, said plate being selectively positioned to extend between and to be wedged between the two rods in the longitudinal plane of the frame and with the hook being looped into the stand fork portion for storage, and alternatively across the gap between the rods, transversely of the plane of the frame, for looping the hook around said frame element.

5. A construction as defined in claim 4, and including a flexible, elongated member extending through an opening formed in said plate and around one of said rods for flexibly and movably connecting the plate to the rod at all times.

6. A bicycle support stand for supporting a conventional bicycle in an upright position, said bicycle having a conventional frame including a pedal crank hub to which is secured an upwardly and forwardly extending frame element, comprising:

a pair of stiff metal rods arranged side by side in a normally upright position, and secured together near their upper ends and at a distance from their lower ends to form upper and lower junctures;

said rods being bent apart at their upper ends, i.e., above the upper juncture, to form a roughly V-shaped fork for receiving said frame element, and said rods being bent apart into an inverted generally V-shape below their lower juncture to form a pair of diverging legs;

and releasable clamping means for securing the frame element to the rods;

and a support means secured to the rods between the junctures for loosely resting the bicycle pedal crank hub thereon;

and said rod portions between the support means and the lower ends of said legs being greater in height than the normal height of said hub above ground, for thereby supporting the bicycle upon the legs and selectively upon either the front or rear wheel of the bicycle.

7. A construction as defined in claim 6, and said rods being bent apart at the support means to form a downwardly arranged V-shape portion between said upper juncture and the support means and for location roughly parallel to and beneath said frame element and then upwardly arranged V-shaped portion between the lower juncture and the support means;

and said support means being in the form of a plate spanning the rods and means rigidly securing the plate to both rods, with the plate extending upwardly and rearwardly of the bicycle frame for supporting the hub between it and the rods.

8. A construction as defined in claim 7 and said clamping means including a hook member for engaging the frame element and for extending between the rods beneath and near the upper juncture, and means for manually releasably securing the hook to the rods.

* * * * *